(12) United States Patent
Breen et al.

(10) Patent No.: US 9,829,944 B2
(45) Date of Patent: *Nov. 28, 2017

(54) MULTIPHASE VOLTAGE REGULATOR USING COUPLED INDUCTORS

(71) Applicant: Dell Products, LP, Round Rock, TX (US)

(72) Inventors: John J. Breen, Harker Heights, TX (US); Abey K. Mathew, Georgetown, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 18 days.

This patent is subject to a terminal disclaimer.

(21) Appl. No.: 14/927,223

(22) Filed: Oct. 29, 2015

(65) Prior Publication Data

US 2016/0048183 A1    Feb. 18, 2016

Related U.S. Application Data

(63) Continuation of application No. 13/897,531, filed on May 20, 2013, now Pat. No. 9,182,798.

(51) Int. Cl.
  *G06F 1/26* (2006.01)
  *H02M 3/158* (2006.01)
  *H02M 1/00* (2006.01)

(52) U.S. Cl.
  CPC ............ *G06F 1/26* (2013.01); *H02M 3/1584* (2013.01); *H02M 2001/0064* (2013.01)

(58) Field of Classification Search
  CPC .... H02M 3/1584; H02M 3/156; H02M 3/158; H02M 2001/0064; G06F 1/26
  See application file for complete search history.

(56) References Cited

U.S. PATENT DOCUMENTS

| 5,477,132 A * | 12/1995 | Canter ................ H02M 3/1582 320/101 |
| 7,720,987 B2 | 5/2010 | Penk et al. |
| 7,859,238 B1 * | 12/2010 | Stratakos ............ H02M 3/1584 323/282 |
| 8,037,330 B2 | 10/2011 | Livescu et al. |
| 9,182,798 B2 * | 11/2015 | Breen ................ H02M 3/1584 |
| 2009/0140706 A1 * | 6/2009 | Taufik ................ H02M 3/1584 323/272 |
| 2009/0307515 A1 | 12/2009 | Bandholz et al. |
| 2010/0106154 A1 | 4/2010 | Harley et al. |

* cited by examiner

*Primary Examiner* — Jue Zhang
(74) *Attorney, Agent, or Firm* — Larson Newman, LLP

(57) ABSTRACT

In response to a condition not being met, asserting a control input of a driver to close a low side switch in a phase leg of a multiphase voltage regulator using coupled inductors, de-asserting the control input in response to a signal to close a high side switch of the phase leg, and asserting the control input in response to a signal to open the high side switch; and in response to the condition not being met, de-asserting the control input, asserting the control input in response to a signal to close a high side switch of another phase leg, and de-asserting the control input in response to a signal to open the high side switch of the other phase leg and to the current in the phase leg being less than a threshold.

11 Claims, 6 Drawing Sheets

MULTIPHASE VOLTAGE REGULATOR USING COUPLED INDUCTORS

CROSS REFERENCE TO RELATED APPLICATIONS

This application is a continuation of U.S. patent application Ser. No. 13/897,531, entitled "Multiphase Voltage Regulator Using Coupled Inductors," filed on May 20, 2013, the disclosure of which is hereby expressly incorporated by reference in its entirety.

FIELD OF THE DISCLOSURE

The present disclosure generally relates to information handling systems, and more particularly relates to voltage regulators for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may use multiphase DC-DC voltage regulators. In some voltage regulator designs, a multiphase converter may operate using only a single phase in response to low current demand by the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Figure 1:
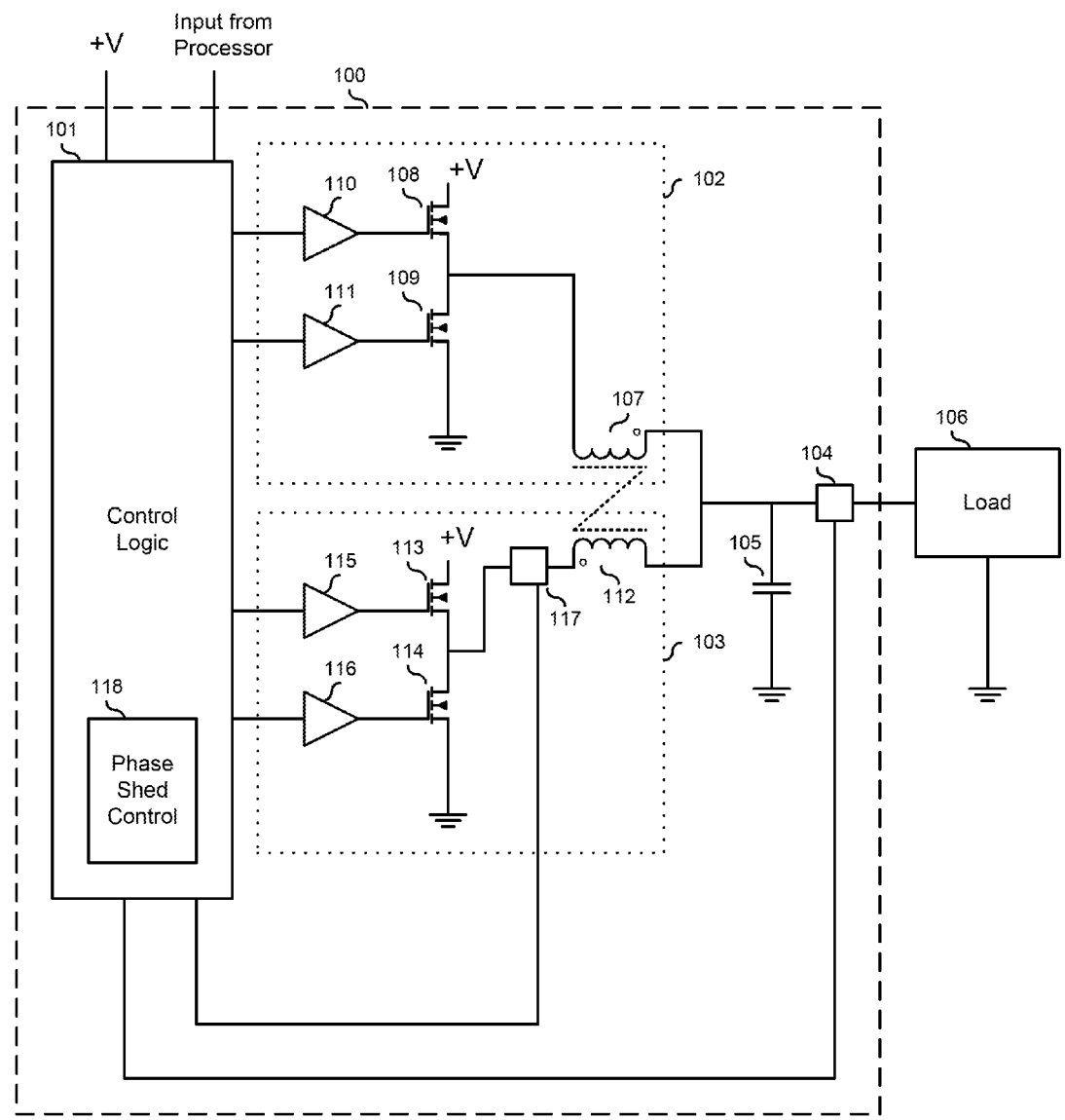
FIG. 1 is a combined circuit and block diagram of a multiphase voltage regulator according to an embodiment of the present disclosure.

FIG. 1 shows a multiphase voltage regulator 100 comprising control logic 101, phase leg 102, phase leg 103, current measuring circuit 104 and capacitor 105. The output of multiphase voltage regulator 100 is connected to load 106. In an embodiment, load 106 is a portion of an information handling system. For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Phase leg 102 includes inductor 107, high side field effect transistor 108, low side field effect transistor 109, high side driver 110, and low side driver 111. High side field effect transistor 108 has a first current electrode connected to a voltage source; and a second current electrode connected to a first electrode of inductor 107 and a first current electrode of low side transistor 109. Low side field effect transistor 109 has a second current electrode connected to electrical ground. Field effect transistors 108 and 109 have gate electrodes connected to output electrodes of drivers 110 and 111, respectively. Drivers 110 and 111 each have an input electrode connected to control logic 101. Phase leg 103 includes inductor 112, high side field effect transistor 113, low side field effect transistor 114, high side driver 115, low side driver 116 and current measuring circuit 117. High side field effect transistor 113 has a first current electrode connected to a voltage source; and a second current electrode connected to a first electrode of current measuring circuit 117 and a first current electrode of low side field effect transistor 114. Low side field effect transistor 114 has a second current electrode connected to electrical ground. Current measuring circuit 117 has a second electrode connected to first electrode of inductor 112. Field effect transistors 113 and 114 have gate electrodes connected to output electrodes of drivers 115 and 116, respectively.

In embodiments of the present disclosure, field effect transistors 108, 109, 113, and 114 operate as switches. In response to a voltage level of a control signal applied to the gate electrode of a field effect transistor, the transistor is turned on and it conducts current with a relatively low resistance, analogous to a closed switch. The level of the control signal that causes a transistor to turn on may be referred to herein as a "high" level. In response to another voltage level of the control signal applied to the gate electrode of the field effect transistor, the transistor is turned off. A field effect transistor that is turned off does not conduct electrical current or conducts current with a relatively high resistance, analogous to an open switch. The level of the control signal that causes a transistor to turn off may be referred to herein as a "low" level. Field effect transistors 108 and 113 may be referred to herein as "high side switches" or as "high side transistors" as they have current electrodes connected to a higher voltage. Field effect transistors 109 and 114 may be referred to herein as "low side switches" or as "low side transistors" as they have current electrodes connected to electrical ground, a lower voltage.

The second electrodes of inductors 107 and 112 are connected to a first electrode of capacitor 105 and to load 106. A second electrode of capacitor 105 and one or more ground connections of load 106 are connected to electrical ground.

Control logic 101 is connected to inputs of drivers 110, 111, 115, and 116, to current measuring circuitry 104, and to current measuring circuit 117. Control logic 101 controls the gate electrodes of field effect transistors 108, 109, 113 and 114 through drivers 110, 111, 115, and 116, respectively. Asserting the input to a driver causes the driver to place a high level onto the gate electrode of the field effect transistor connected to the output of the driver, thus turning on the transistor. De-asserting the input to a driver causes the driver to place a low level onto the gate electrode of the field effect transistor connected to the output of the driver, thus turning off the transistor connected to the output of the driver. Field effect transistors 108, 109, 113 and 114 are turned on and off by control circuitry 101 through drivers 110, 111, 115, and 116 in a particular manner to be described.

Multiphase voltage regulator 100 operates by connecting one of inductors 107 or 112 to a voltage source through a low resistance path for a time interval. Connecting an inductor to a voltage source drives a current through the inductor. During the time interval in which the inductor is connected to the voltage source, an increasing current flows from the voltage source through the inductor. The increasing current stores energy in a magnetic field of the inductor. At the end of the time interval, the inductor is disconnected from the voltage source and connected to electrical ground, the energy in the magnetic field allows a decreasing current to continue to flow through the inductor. Voltage regulator 100 operates in one of two operating modes. Each operating mode repeats a particular sequence of connecting and disconnecting one or both inductors to a voltage source. Each repetition of the sequence in a particular operating mode may be referred to herein as a "cycle" of the particular mode. In a high current operating mode, control logic 101 connects and disconnects the first electrode of inductor 107 to a voltage source through high side field effect transistor 108, then connects and disconnects the first electrode of inductor 112 to the voltage source through high side field effect transistor 113. In a low current operating mode, control logic 101 repeatedly connects and disconnects the first electrode of inductor 107 to a voltage source through high side field effect transistor 108 without connecting inductor 112 to the voltage source. The operation of the regulator in each of the particular operating modes is described in greater detail in reference to FIG. 2.

Control logic 101 includes phase shed control 118. Phase shed control 118 determines an operating mode of voltage regulator 100 based on the current demanded by load 106. In an embodiment, phase shed control 118 determines the current demanded by load 106 using current measuring circuit 104. In response to a higher current demand by load 106 phase shed control 118 selects the high current operating mode, and in response to a lower current demand by load 106 phase shed control 118 selects the low current operating mode. Load 106 may change the current that it demands, and in response phase shed control 118 may change the operating mode of voltage regulator 100.

In an embodiment, phase shed control 118 determines an operating mode for voltage regulator 100 in response to the current measured by current measuring circuit 104. Current measuring circuit 104 measures the current provided to load 106. In an embodiment, control logic 101 is coupled to a processor in an information handling system. The processor may instruct the control logic to operate in the first operating mode or in the second operating mode. In a particular embodiment, each phase leg has block 117. The sum of the currents for all phases is the total current provided to load 106, thus current measuring circuit 104 may be omitted.

Inductor 107 and inductor 112 are magnetically coupled, for example by being wound on the same core, so that a current flowing in one inductor induces a current in the other inductor. Inductor 107 and inductor 112 in combination may be referred to herein as a coupled inductor, inductor 107 may referred to herein as the first winding of the coupled inductor and inductor 112 may be referred to herein as the second winding of the coupled inductor.

It will be appreciated that two phase legs are used for illustrative purposes, and that voltages regulators with more than two phases may be constructed. Phase leg 103 may be replicated, with the inductors of all phase legs magnetically coupled, and logic added to control logic 101 to control the drivers for the additional phase legs. Operating modes may be defined in which all phase legs operate, or in which a subset of the phase legs operate and the inoperative legs are controlled as described herein for phase leg 103.

Figure 2:
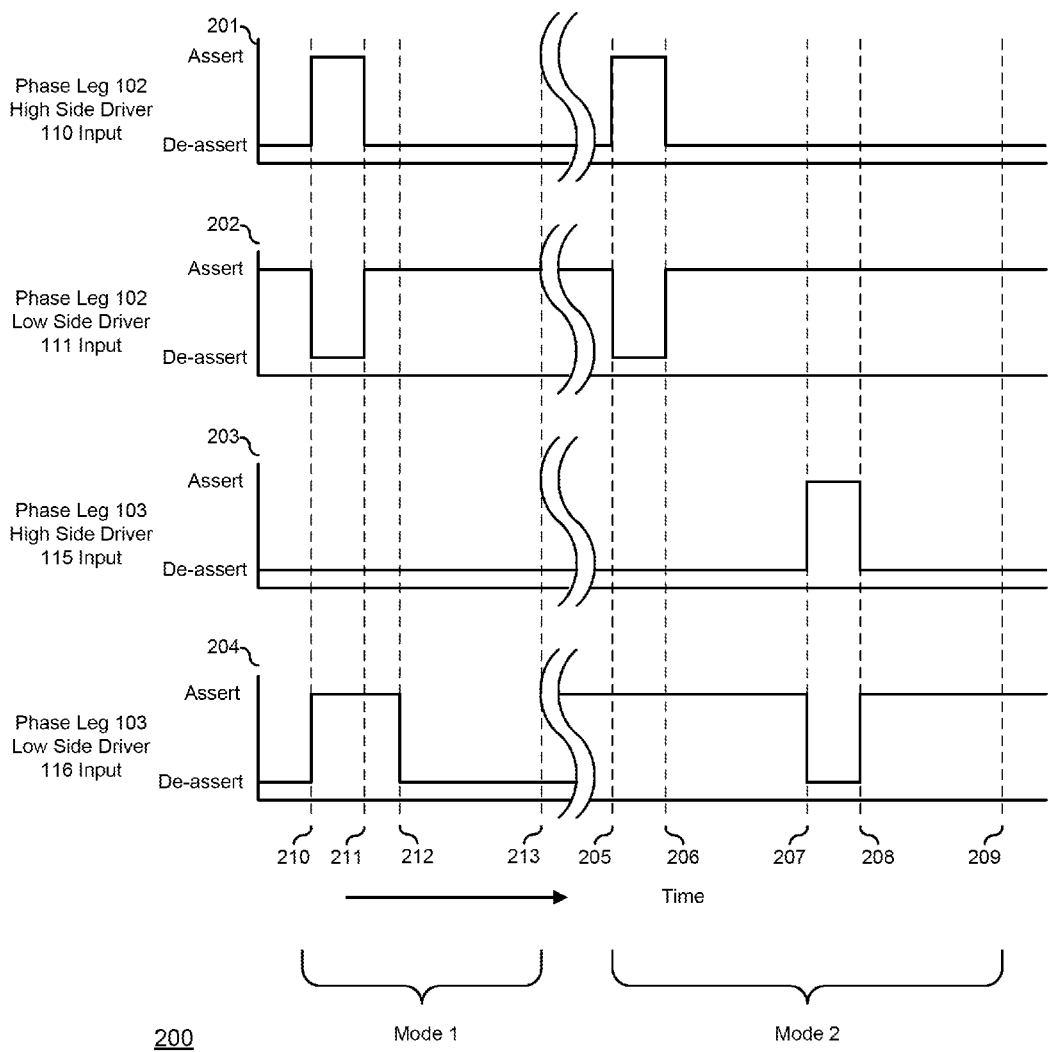
FIG. 2 is a timing diagram illustrating the operation of a multiphase voltage regulator according to an embodiment of the present disclosure.

FIG. 2. shows timing diagram 200 with waveforms 201, 202, 203, and 204 illustrating the particular pattern of asserting and de-asserting the inputs of drivers 110, 111, 115 and 116, respectively, for one cycle of multiphase voltage regulator 100 in each of two modes of operation. A high signal level of a signal illustrated at FIG. 2 indicates asserting the input to a driver, thus turning on the field effect transistor connected to the output of the driver. A low signal level indicates de-asserting the input to a driver, thus turning off the field effect transistor connected to the output of the driver. The horizontal axis of timing diagram 200 represents time, with signal transitions occurring at times 205-208 and 210-212. The time axis is not drawn to scale.

In response to a relatively lower current demanded by load 106, control logic 101 operates the multiphase voltage regulator in a low current mode, herein referred to as mode 1, driving current through the inductor of only one phase leg of multiphase voltage regulator 100. In the illustrated embodiment, mode 1 drives current through inductor 107 of phase leg 102. The time interval from time 210 to time 213 at FIG. 2 illustrates one cycle of mode 1. Immediately prior to the beginning of a cycle of mode 1 the inputs to drivers 110, 115 and 116 are in a de-asserted state, so that field effect transistors 108, 113 and 114 are turned off; and the input to driver 111 is in an asserted state, so that field effect transistor 109 is turned on. At time 210, control logic 101 asserts the inputs to drivers 110 and 116, turning on field effect transistors 108 and 114, and de-asserts the input to driver 111, turning off field effect transistor 109. Turning on field effect transistor 108, closing the high side switch of phase leg 102, connects one end of inductor 107 to a voltage source. Turning off field effect transistor 109, opening the low side switch of phase leg 102, prevents current flowing from the voltage source through field effect transistor 108 and field effect transistor 109 to electrical ground, allowing current to flow through inductor 107. Current flows through inductor 107 to capacitor 105 and load 106. Control logic 101 maintains voltage regulator 100 in this configuration in the time interval beginning at time 210 and ending at time 211. At time 211, control logic 101 de-asserts the input to driver 110, turning off field effect transistor 108; and asserts the input to driver 111, turning on field effect transistor 109. The input to driver 116 remains asserted at time 211, so that field effect transistor 114 remains turned on.

The increasing current flowing through inductor 107 during the interval from time 210 to time 211 induces a current in inductor 112 because inductors 107 and 112 are magnetically coupled. Asserting the input to driver 116 at time 210, turning on field effect transistor 114, provides a low resistance path to electrical ground for the induced current in inductor 112 which would otherwise flow through the body diode of field effect transistor 114. At time 211 current continues to flow in inductor 112. At time 212, control logic 101 de-asserts the input to driver 116, turning off field effect transistor 114. In an embodiment, time 211 and time 212 are the same time. In other embodiments, control logic 101 de-asserts the input to driver 116, turning off field effect transistor 114, at time 212 in response to the end of the time interval at time 211 and to the current flowing through inductor 112 falling below a predetermined threshold.

In response to a relatively higher current demanded by load 106, control logic 101 operates the multiphase voltage regulator in a high current mode, herein referred to as mode 2, using both phase legs of voltage regulator 100. The time interval from time 205 to time 209 at FIG. 2 illustrates one cycle of mode 2. A cycle of mode 2 begins at time 205. Immediately prior to the beginning of the cycle the inputs to drivers 110 and 115 are in a de-asserted state, so that field effect transistors 108 and 113 are turned off; and the inputs to drivers 111 and 116 are in an asserted state, so that field effect transistors 109 and 114 are turned on providing a low resistance path to electrical ground for inductors 107 and 112, respectively. At time 205, control logic 101 asserts the input to driver 110, turning on field effect transistor 108; and de-asserts the input to driver 111, turning off field effect transistor 109. Turning on field effect transistor 108, closing the high side switch of phase leg 102, connects inductor 107 to a voltage source. Turning off field effect transistor 109, opening the low side switch of phase leg 102, prevents current from flowing from the voltage source through field effect transistor 108 and field effect transistor 109 to electrical ground. This configuration drives current through inductor 107. Current flows through inductor 107 into capacitor 105 and load 106. Control logic 101 maintains voltage regulator 100 in this configuration in the time interval beginning at time 205 and ending at time 206. During this interval, the current flowing through inductor 107 increases. At time 206, control logic 101 de-asserts the input to driver 110, turning off field effect transistor 108; and asserts the input to driver 111, turning on field effect transistor 109, as illustrated at waveforms 201 and 202.

At time 207, control logic 101 asserts the input to driver 115, turning on field effect transistor 113; and de-asserts the input to driver 116, turning off field effect transistor 114. Turning on field effect transistor 113, closing the high side switch of phase leg 103, connects inductor 112 to a voltage source. Current flows through inductor 112 into capacitor 105 and load 106. Control logic 101 maintains voltage regulator 100 in this configuration in the time interval beginning at time 207 and ending at time 208. At time 208, control logic 101 de-asserts the input to driver 115, turning off field effect transistor 113, and asserts the input to driver 116, turning on field effect transistor 114. Control logic 101 maintains voltage regulator 100 in this configuration until time 209, completing one cycle of operation in mode 2. After time 209, the control gates of field effect transistors 108, 109, 113, and 114 are in the same configuration as immediately prior to the beginning of the cycle and another cycle may be started by control logic 101.

In an embodiment, control logic 101 determines a value of current flowing through inductor 112 using current measuring circuit 117. In another embodiment, current measuring circuit 117 provides an indication to control logic 101 indicating whether the current is greater than or less than a predetermined threshold. Current measuring circuit 117 may use any suitable means known in the art for measuring current. For example, a resistor may be connected between inductor 112 and the first current electrode of field effect transistor 114. The voltage drop across the resistor, caused by current flowing through the resistor, may be compared with a reference voltage. An output signal of current measuring circuit 117 is provided to control logic 101 indicating that the current through inductor 112 is greater than or less than a predetermined threshold.

Control logic 101 detects the load current of voltage regulator 100 using current measuring circuit 104. In an embodiment, current measuring circuit 104 provides a value of current flowing to load 106. In another embodiment, current measuring circuit 104 provides an indication that the current flowing to load 106 is greater than or less than a predetermined value. In yet another embodiment, current measuring circuit 104 provides a plurality of indications, each indicating that the current flowing to load 106 is greater than or less than one of a plurality of predetermined values. As discussed with respect to current measuring circuit 117, any suitable current measuring means may be used to implement current measuring circuit 104.

Those skilled in the art will appreciate that the waveforms depicted at FIG. 2 represent ideal signals with zero rise and fall times. In an implementation of a multiphase voltage regulator, the inputs to drivers 110, 111, 115, and 116 will have non-zero rise and fall times. Techniques commonly used in the design of buck voltage regulators to compensate for non-ideal signals and components may be used with the present disclosure. For example, FIG. 2 shows low side driver 111 being turned off and the high side field driver 110 being turned on at time 206. In order to avoid having field effect transistors 108 and 109 turned on simultaneously when signals have non-zero rise and fall times, control logic 101 may be designed to delay turning on the high side transistor by a predetermined time dependent on the particular characteristics of the field effect transistors.

It will be appreciated that the currents illustrated and discussed in FIG. 1 and FIG. 2 can be positive or negative currents and that the terms "provide" and "receive" with respect to specific signals do not imply any specific direction of current flow.

Figure 3:
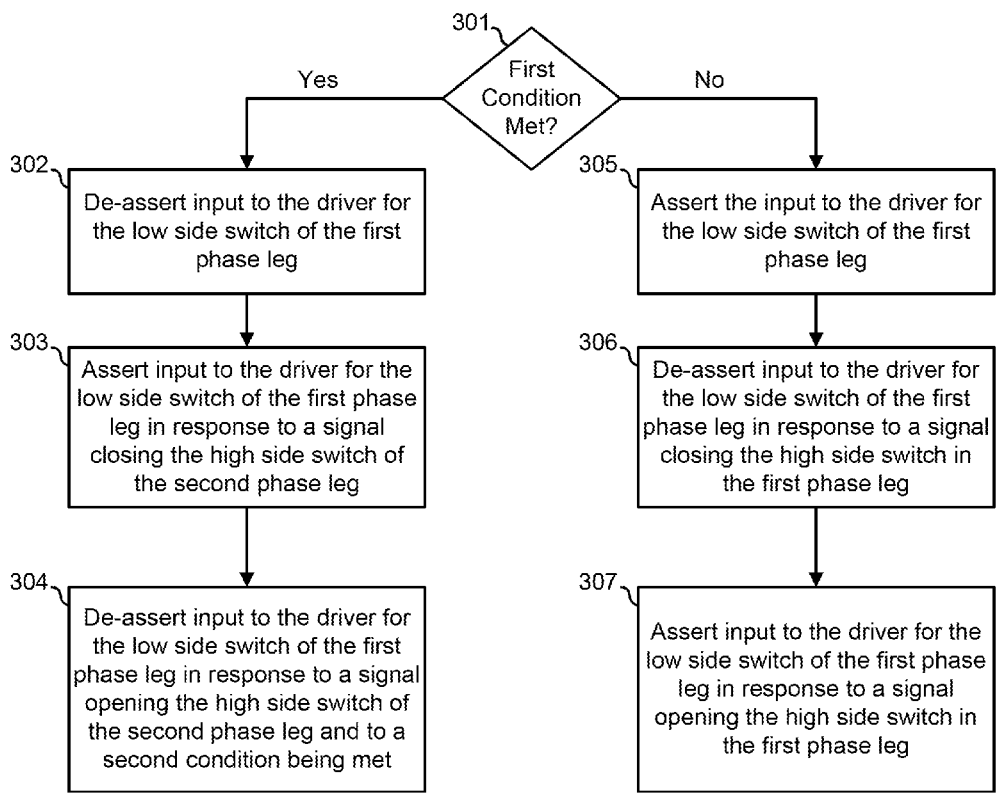
FIG. 3 is a flow diagram illustrating a method for operating a multiphase voltage regulator according to an embodiment of the present disclosure.

FIG. 3 shows flow diagram 300 illustrating a method for operating a multiphase voltage regulator using coupled inductors in accordance with an embodiment of the present disclosure. For purposes of discussion, the multiphase voltage regulator described has two legs, each leg having an inductor with two terminals. One terminal of each inductor may be connected by a switch to a supply voltage, to electrical ground, or to neither the voltage source nor to electrical ground. The other terminal of each inductor is connected to the load. Each phase leg has a high side switch that, when closed, provides a low resistance path from the first terminal of the inductor for the phase leg to a supply voltage. Each phase leg also has a low side switch which, when closed, provides a low resistance path from the first terminal of the inductor for the phase leg to electrical ground. Each switch has a driver controlled by control logic. Asserting the input to a driver closes the associated switch, providing a low resistance path through the switch. De-asserting the input to a driver opens the associated switch. The flow diagram illustrates a method for controlling the input to a driver for a low side switch for a phase leg of the multiphase voltage regulator by asserting and de-asserting the input in a particular pattern.

The method begins with step 301, determining whether a condition is met. In an embodiment, the condition to be met is a determination that the current demanded by the load of the voltage regulator is less than a predetermined threshold. In response to the condition being met, the regulator is operated in a first mode and the method proceeds to step 302. The first mode is a low current single phase mode in which current is driven through the inductor of the second phase leg. At step 302, the input to the driver for the low side switch of the first phase leg is de-asserted. The input to a driver for the high side switch for the first phase is also de-asserted, so that the first terminal of the inductor of the first phase is not connected to either a supply voltage or to electrical ground. The input to the driver for the low side switch of the second phase is asserted, providing a low resistance path through the low side switch from the first terminal of the inductor of the second phase to electrical ground. The driver for the high side switch of the second phase is de-asserted, so that the high side switch of the second phase is open.

The method continues at step 303. At step 303, a signal closes the high side switch of the second phase to connect the first terminal of the inductor of the second phase to a supply voltage. In response to this signal the input to the driver for the low side switch for the first phase is asserted, providing a low resistance path to electrical ground from the first terminal of the inductor of the first phase. An induced current in the first inductor flows to electrical ground through this low resistance path. The low side switch of the second phase is opened at this step, preventing current from flowing from a power supply through the high side switch of the second phase leg and the low side switch second phase leg to electrical ground.

At step 304, the input to the driver for the low side switch for the first phase leg is de-asserted in response to a signal opening the high side switch of the second phase leg and to a second condition being met. In an embodiment, the second condition is the current flowing through the inductor of the first phase leg being below a predetermined value. The value of the current flowing through the inductor of the first phase leg may be measured or sensed directly, for example by current measuring circuit 117 at FIG. 1, or the current may be calculated based on voltages and inductances as described below with respect to FIG. 4.

Returning to step 301, in response to the first condition not being met, the regulator is operated in a second mode and the method continues at step 305. The second mode is a high current multiphase mode in which current is driven through the inductor of each phase leg in turn. To drive a current through an inductor of a phase leg, the high side switch of the phase leg is closed and the low side switch is opened. The low side switches for the phase legs not being driven are closed. At step 305, the input to the driver for the low side switch of the first phase leg is asserted, closing the switch. The method continues at step 306. At step 306 a signal closes the high side switch of the first phase leg. In response to this signal, the input to the driver for the low side switch of the first phase leg is de-asserted, opening the switch. Opening the low side switch and closing the high side switch cause a current to flow from the voltage source through the inductor of the first phase leg. The method continues at step 307, asserting the input to the driver for the low side switch of the first phase leg in response to a signal opening the high side switch of the first phase leg.

Figure 4:
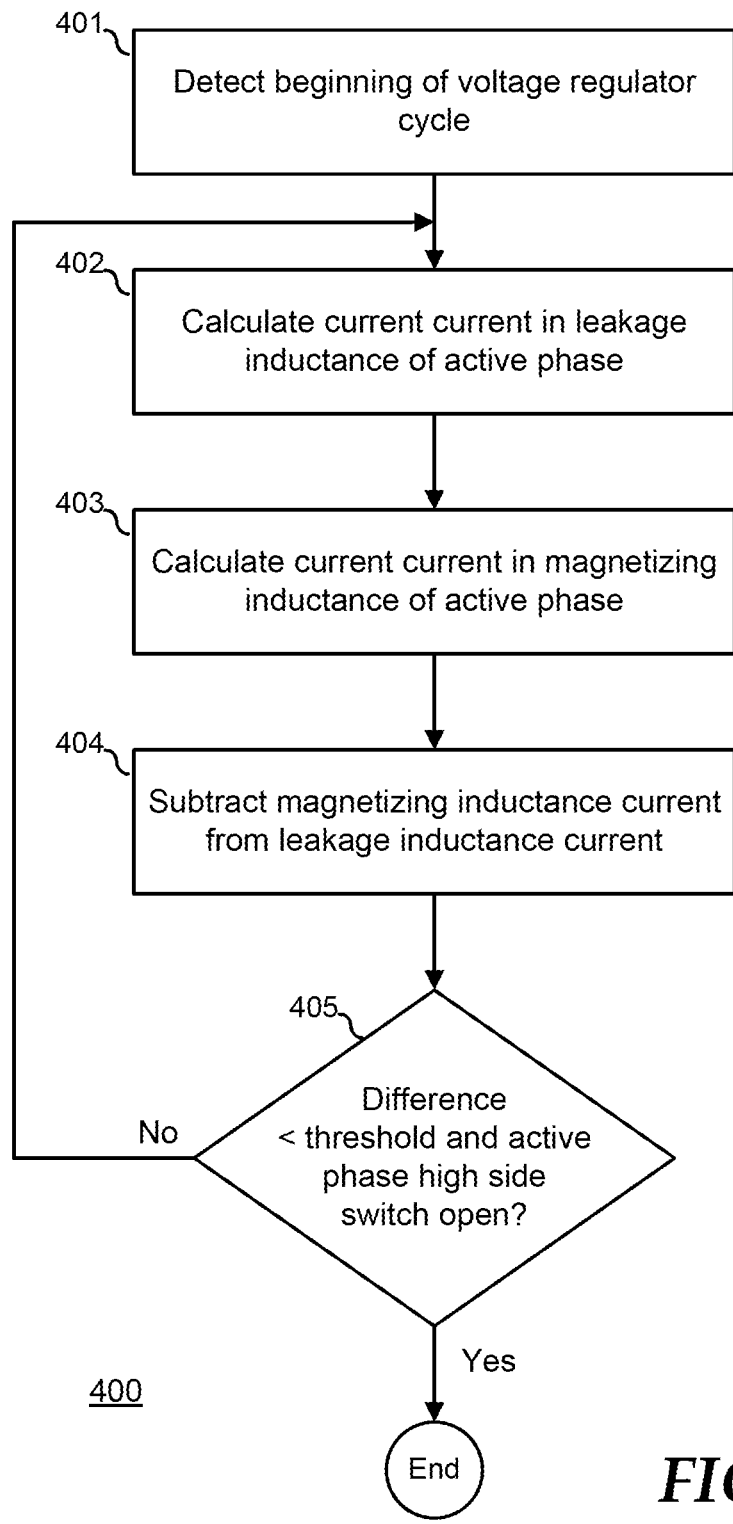
FIG. 4 is a flow diagram illustrating a method for determining a condition by calculating a current flowing through an inductor according to an embodiment of the present disclosure.

FIG. 4 shows flow diagram 400, illustrating a method for calculating the value of the current flowing through an inductor in a phase leg of a multiphase voltage regulator using coupled inductors in accordance with an embodiment of the present disclosure. As discussed with respect to step 304 at FIG. 3, in particular embodiments, the control logic for a multiphase voltage regulator de-asserts an input to a driver for the low side switch of a phase leg based on a condition that includes the current through the inductor for the phase leg being below a threshold value. The method of FIG. 4 calculates the value of current flowing through the inductor of an inactive phase leg based on voltages and inductances. This current is a function of time in the current cycle. The calculation of the current is based on the input voltage $V_{in}$ to the multiphase voltage regulator, the output voltage $V_o$ of the multiphase voltage regulator and characteristics of the inductor of the active phase leg. In an embodiment, current measuring circuitry 104 contains a voltage sense point to provide an indication of the output voltage to control logic 101. Control logic 101 contains logic to measure the value of the input voltage to voltage regulator 100.

The method illustrated at FIG. 4 uses a model representing an inductor in a phase leg as two inductances in series. The first inductance is a magnetizing inductance designated by the symbol $L_{mag}$. The second inductance is a leakage inductance designated by the symbol $L_{lkg}$. The values of $L_{mag}$ and $L_{lkg}$ are determined by the construction of the coupled inductors of the multiphase voltage regulator and are treated as predetermined constant values for the purposes of the calculation. Control logic uses the predetermined values of $L_{mag}$ and $L_{lkg}$ in the calculation of the current flowing through the inductor. The current flowing through the inductor of the inactive phase leg is modeled as the difference between the current flowing through the leakage inductance $L_{lkg}$ of the active phase leg and the current flowing through the magnetizing inductance $L_{mag}$ of the active phase leg.

The current though the inductor of the inactive phase leg is calculated by control logic when the multiphase voltage regulator is operating in the first mode as described with respect to FIG. 3. The method begins at step 401, detecting the beginning of a cycle of the multiphase voltage regulator. For purposes of this method the time at which the input is asserted of the driver for the high side switch of the other phase, time 210 at FIG. 2, is defined to be the beginning of the cycle and is time zero (0) in the cycle. Other times within the cycle, for example times 211 and 212 at FIG. 2, are positive times. The time in a cycle will be designated by the symbol $T_{on}$ in the description of calculation. The method continues by repeating steps 402-405, as discussed below, until the condition at step 405 is met. In an embodiment of the present disclosure, control logic performs steps 402-405 essentially at the same time and calculates the current flowing through the inductor continuously. In another embodiment, control logic calculates the current at discrete intervals during a cycle of the multiphase voltage regulator.

At step 402, the method calculates the value of the current flowing through the leakage inductance $L_{lkg}$, as a function of the time in the cycle $T_{on}$. During the interval that high side switch for the active phase leg is closed (time 210 to time 211 at FIG. 2) the current is calculated by the equations:

$$I_{lkg}(T_{on}) = \frac{(V_{in} - 2V_o) * T_{on}}{L_{lkg}} \text{ for time } 210 \leq T_{on} \leq \text{time } 211$$

$$V_{lkg}(T_{on}) = (V_{in} - 2V_o) \text{ for time } 210 \leq T_{on} \leq \text{time } 211$$

$$I_{lkg}(T_{on}) = \frac{V_{lkg}(T_{on}) * T_{on}}{L_{lkg}} \text{ for time } 210 \leq T_{on} \leq \text{time } 211$$

During the interval that the high side switch for the active phase leg is open (time 211 to time 212 at FIG. 2) the value of the current flowing through the leakage inductance is calculated using the equations:

$$V_{lkg}(T_{on}) = (-2V_o) \text{ for time } 211 < T_{on} \leq \text{time } 212$$

$$I_{lkg}(T_{on}) = I_{lkg}(T_{time211}) + \frac{(V_{lkg} * T_{on})}{L_{lkg}} \text{ for time } 211 < T_{on} \leq \text{time } 212$$

In the formula above, the value $I_{lkg}(T_{time211})$ represents the value of current calculated for time 211.

The method continues at step 403 by calculating the current flowing through the magnetizing inductance. The value of the current flowing through the magnetizing inductance $L_{mag}$ is calculated using the formula:

$$V_{mag}(T_{on}) = V_o \text{ for time } 210 \leq T_{on} \leq \text{time } 212$$

$$I_{mag}(T_{on}) = \frac{(V_{mag}) * T_{on}}{L_{mag}} \text{ for time } 210 \leq T_{on} \leq \text{time } 212$$

The method continues with step 404, calculating the current flowing through the inductor of the inactive phase leg by subtracting the current flowing through the magnetizing inductance ($L_{mag}$) from the current flowing through the leakage inductance ($L_{lkg}$) using formula:

$$I_{inductor}(T_{on}) = I_{lkg}(T_{on}) - I_{mag}(T_{on}) \text{ for time } 210 \leq T_{on} \leq \text{time } 212$$

At step 405, the method compares the calculated value of the current to a predetermined threshold value. If the calculated value for the current flowing through the inductor is not less than the predetermined threshold the method returns to step 402. If the calculated value for the current flowing through the inductor is less than the predetermined threshold, the method ends. Control logic de-asserts the input to the driver of the low side switch, opening the switch.

At a future time, the voltage regulator may begin another cycle. Calculation of the current in a second cycle begins with the time at which the input to the driver for the high side switch of the other phase leg is asserted for the second cycle. This time will designated as time zero for the second cycle.

Figure 5:
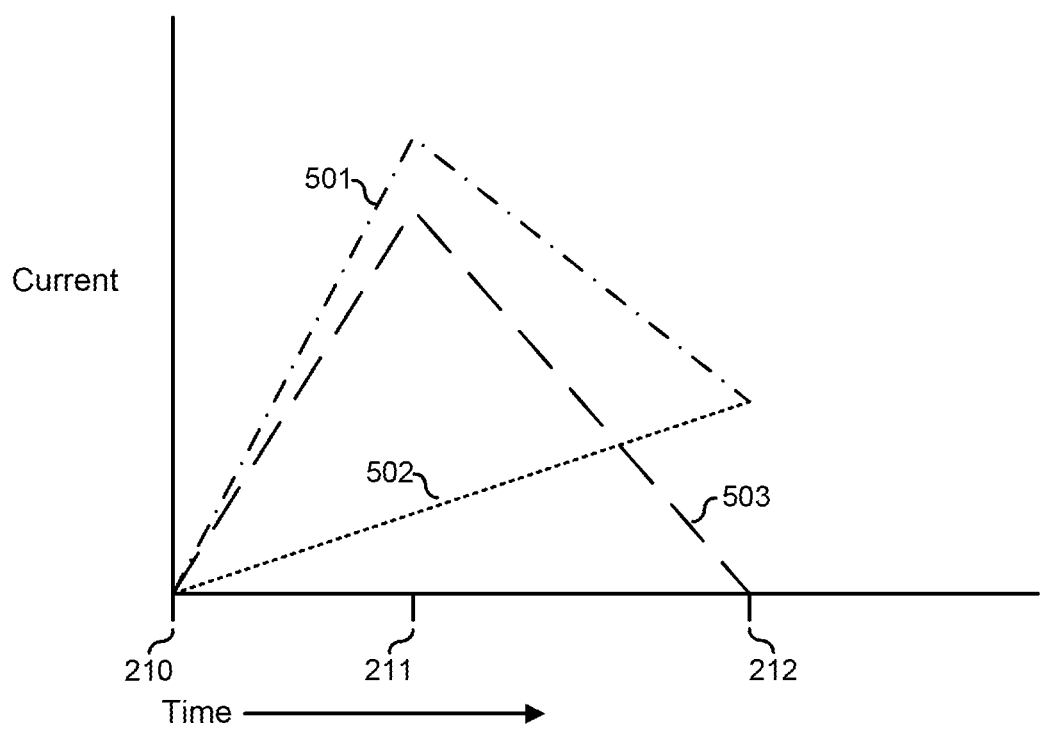
FIG. 5 is a graph of currents in a multiphase voltage regulator according to an embodiment of the present disclosure.

FIG. 5 is a graph of current against time according to an embodiment of the present disclosure. Times 210, 211 and 212 are times at which the inputs to drivers are asserted and de-asserted as described with respect to FIG. 2. Leakage inductance current ($I_{lkg}$)501, magnetizing inductance current ($I_{mag}$) 502 and inductor current ($I_{inductor}$)503 are computed as described above with respect to FIG. 4.

Figure 6:
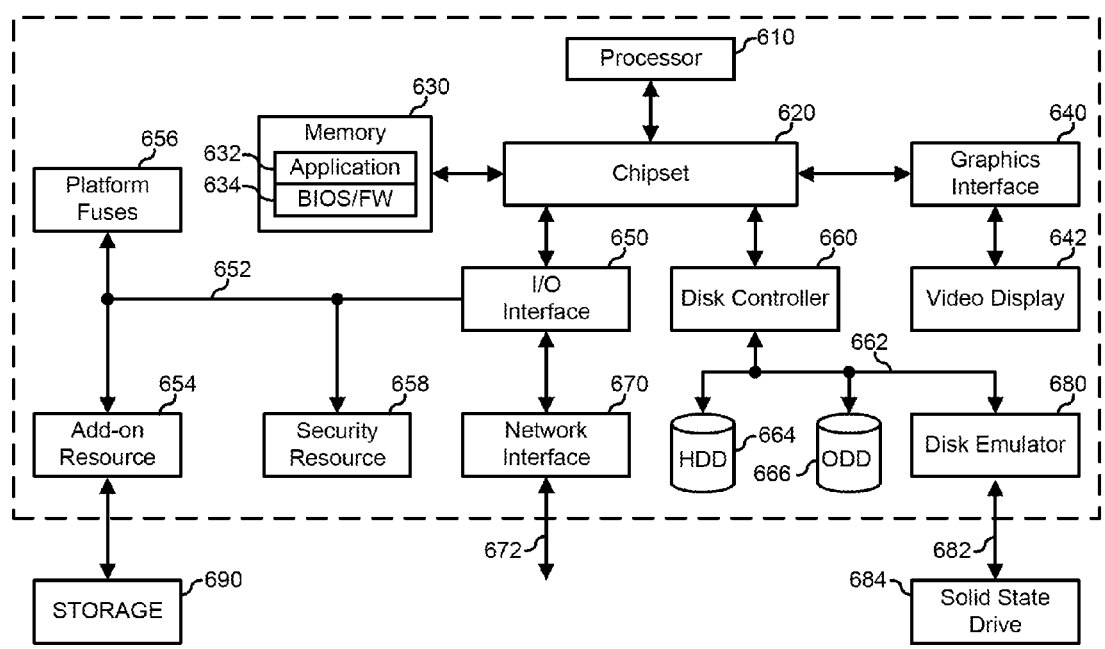
FIG. 6 is a block diagram illustrating an information handling system according to an embodiment of the present disclosure.

FIG. 6 is a block diagram illustrating an embodiment of an information handling system 600, including a processor 610, a chipset 620, a memory 630, a graphics interface 640, an input/output (I/O) interface 650, a disk controller 660, a network interface 670, and a disk emulator 680. In a particular embodiment, information handling system 600 is used to carry out one or more of the methods described herein. In another embodiment, one or more of the systems described herein are implemented in the form of information handling system 600.

Chipset 620 is connected to and supports processor 610, allowing the processor to execute machine-executable code. In a particular embodiment, information handling system 600 includes one or more additional processors, and chipset 620 supports the multiple processors, allowing for simultaneous processing by each of the processors and permitting the exchange of information among the processors and the other elements of the information handling system. Chipset 620 can be connected to processor 610 via a unique channel, or via a bus that shares information among the processor, the chipset, and other elements of information handling system 600.

Memory 630 is connected to chipset 620. Memory 630 and chipset 620 can be connected via a unique channel, or via a bus that shares information among the chipset, the memory, and other elements of information handling system 600. In another embodiment (not illustrated), processor 610 is connected to memory 630 via a unique channel. In another embodiment (not illustrated), information handling system 600 includes separate memory dedicated to each of the one or more additional processors. A non-limiting example of memory 630 includes static random access memory (SRAM), dynamic random access memory (DRAM), nonvolatile random access memory (NVRAM), read only memory (ROM), flash memory, another type of memory, or any combination thereof.

Graphics interface 640 is connected to chipset 620. Graphics interface 640 and chipset 620 can be connected via a unique channel, or via a bus that shares information among the chipset, the graphics interface, and other elements of information handling system 600. Graphics interface 640 is connected to a video display 642. Other graphics interfaces (not illustrated) can also be used in addition to graphics interface 640 as needed or desired. Video display 642 includes one or more types of video displays, such as a flat panel display, another type of display device, or any combination thereof.

I/O interface 650 is connected to chipset 620. I/O interface 650 and chipset 620 can be connected via a unique channel, or via a bus that shares information among the chipset, the I/O interface, and other elements of information handling system 600. Other I/O interfaces (not illustrated) can also be used in addition to I/O interface 650 as needed or desired. I/O interface 650 is connected via an I/O interface 652 to one or more add-on resources 654. Add-on resource 654 is connected to a storage system 690, and can also include another data storage system, a graphics interface, a network interface card (NIC), a sound/video processing card, another suitable add-on resource or any combination thereof. I/O interface 650 is also connected via I/O interface 652 to one or more platform fuses 656 and to a security resource 658. Platform fuses 656 function to set or modify the functionality of information handling system 600 in hardware. Security resource 658 provides a secure cryptographic functionality and includes secure storage of cryptographic keys. A non-limiting example of security resource 658 includes a Unified Security Hub (USH), a Trusted Platform Module (TPM), a General Purpose Encryption (GPE) engine, another security resource, or a combination thereof.

Disk controller 660 is connected to chipset 620. Disk controller 660 and chipset 620 can be connected via a unique channel, or via a bus that shares information among the chipset, the disk controller, and other elements of information handling system 600. Other disk controllers (not illustrated) can also be used in addition to disk controller 660 as needed or desired. Disk controller 660 includes a disk interface 662. Disk controller 660 is connected to one or more disk drives via disk interface 662. Such disk drives include a hard disk drive (HDD) 664, and an optical disk drive (ODD) 666, and can include one or more disk drive as needed or desired. ODD 666 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 660 is connected to disk emulator 680. Disk emulator 680 permits a solid-state drive 684 to be coupled to information handling system 600 via an external interface 682. External interface 682 can include industry standard busses such as USB or IEEE 1394 (Firewire) or proprietary busses, or any combination thereof. Alternatively, solid-state drive 684 can be disposed within information handling system 600.

Network interface device 670 is connected to I/O interface 650. Network interface 670 and I/O interface 650 can be coupled via a unique channel, or via a bus that shares information among the I/O interface, the network interface, and other elements of information handling system 600. Other network interfaces (not illustrated) can also be used in addition to network interface 670 as needed or desired. Network interface 670 can be a network interface card (NIC) disposed within information handling system 600, on a main circuit board such as a baseboard, a motherboard, or any combination thereof, integrated onto another component such as chipset 620, in another suitable location, or any combination thereof. Network interface 670 includes a network channel 672 that provide interfaces between information handling system 600 and other devices (not illustrated) that are external to information handling system 600. Network interface 670 can also include additional network channels (not illustrated).

Information handling system 600 includes one or more application programs 632, and Basic Input/Output System and Firmware (BIOS/FW) code 634. BIOS/FW code 634 functions to initialize information handling system 600 on power up, to launch an operating system, and to manage input and output interactions between the operating system and the other elements of information handling system 600. In a particular embodiment, application programs 632 and BIOS/FW code 634 reside in memory 630, and include machine-executable code that is executed by processor 610 to perform various functions of information handling system 600. In another embodiment (not illustrated), application programs and BIOS/FW code reside in another storage medium of information handling system 600. For example, application programs and BIOS/FW code can reside in HDD 664, in a ROM (not illustrated) associated with information handling system 600, in an option-ROM (not illustrated) associated with various devices of information handling system 600, in storage system 690, in a storage system (not illustrated) associated with network channel 672, in another storage medium of information handling system 600, or a combination thereof. Application programs 632 and BIOS/FW code 634 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   determining, by a first current sensor, that a first current flowing through a load is above a first predetermined threshold;
   in response to determining that the first current is above the first predetermined threshold;
      asserting a control input of a driver to close a low side switch of a first phase leg of a multiphase voltage regulator, wherein the first phase leg includes a first inductor;
      in response to a signal to close a first high side switch of the first phase leg, de-asserting the control input to open the low side switch; and
      in response to a signal to open the first high side switch, asserting the control input to close the low side switch; and
   in response to determining that the first current is not above the first predetermined threshold:
      de-asserting the control input to open the low side switch;
      in response 1) to a signal to close a second high side switch of a second phase leg of the multiphase voltage regulator and 2) to the control input being de-asserted, asserting the control input to close the low side switch, wherein the second phase leg includes a second inductor magnetically coupled to the first inductor; and
      in response 1) to a signal to open the second high side switch and 2) to the control input being asserted determining, by a second current sensor, that a second current flowing through the first inductor is below a second predetermined threshold; and
      de-asserting the control input to open the low side switch in response to determining that the second current is below the second predetermined threshold.

2. The method of claim 1, wherein the low side switch, the first high side switch and the second high side switch are field effect transistors.

3. The method of claim 1, wherein the second predetermined threshold is zero.

4. The method of claim 1, wherein determining the second current flowing through the first inductor comprises:
   determining a voltage drop across a resistor, wherein the resistor is coupled to the low side switch and to the first inductor.

5. An information handling system comprising:
   a central processing unit; and
   a multiphase voltage regulator coupled to the central processing unit and providing a load current to the information handling system, the voltage regulator including:
      a load current sensor to determine the load current level;
      a first phase leg comprising a first inductor, an inductor current sensor to determine an inductor current level, a first high side switch, and a low side switch;
      a second phase leg comprising a second inductor and a second high side switch, wherein the second inductor is magnetically coupled to the first inductor;
      a first driver having a first input, wherein asserting the first input closes the low side switch and de-asserting the input opens the low side switch;
      a second driver having a second input, wherein asserting the second input closes the second high side switch and de-asserting the second input opens the second high side switch;
      a third driver having a third input, wherein asserting the third input closes the first high side switch and de-asserting the third input opens the first high side switch; and
      control logic coupled to the load current sensor, the inductor current sensor, the first input, the second input and the third input; wherein the control logic is operable to determine that the load current level is above a first predetermined threshold and to operate in a first mode to:
         assert the first input to close the low side switch;
         de-assert the first input to open the low side switch and assert the third input, in response to the beginning of a first time interval; and
         assert the first input to close the low side switch and de-assert the third input, in response to the end of the first time interval; and
      the control logic is operable to determine that the load current level is below the first predetermined threshold and to operate in a second mode to:
         de-assert the first input to open the first low side switch;

assert the first input to close the first low side switch and assert the second input, in response to the beginning of a second time interval;
de-assert the second input, in response to the end of the second time interval;
determine that the inductor current level is below a second predetermined threshold; and
de-assert the first input to open the low side switch, in response to a determining that the inductor current level is below the second predetermined threshold.

6. The information handling system of claim 5, wherein: the control logic operates in the second mode in response to an indication from the central processing unit.

7. The information handling system of claim 5, wherein: the first high side switch, the second high side switch and the first low side switch are field effect transistors.

8. The information handling system claim 5, wherein the predetermined threshold is zero.

9. A multiphase buck voltage regulator comprising:
a first current sensor to determine a load current;
a coupled inductor having a first winding and a second winding;
a second current sensor to determine an inductor current in the first winding;
a switch operable to direct current in the first winding to electrical ground;
a driver having a control input, wherein the driver is operable to close the switch in response to the control input being asserted and operable to open the switch in response to the control input being de-asserted; and
control circuitry operable to determine that the load current is above a first predetermined threshold and in response, to:
in response to the beginning of a first time interval, begin driving a current through the first winding and de-assert the control input to open the switch;
in response to the end of the first time interval, stop driving a current through the first winding and assert the control input to close the switch;
in response to the beginning of a second time interval, begin driving a current through the second winding; and
in response to the end of the second time interval, stop driving a current through the second winding; and
to determine that the load current is below the first predetermined threshold and in response to:
in response to the beginning of a third time interval, begin driving a current through the second winding and assert the control input to close the switch;
in response to the end of the third time interval, stop driving a current through the second winding; and
in response to the end of the third time interval and to the inductor current being less than or equal to a second predetermined threshold, de-assert the control input to open the switch.

10. The multiphase buck voltage regulator of claim 9, wherein:
the switch is a field effect transistor.

11. The multiphase buck voltage regulator of claim 9, wherein the first second predetermined threshold is zero.

* * * * *